United States Patent [19]

Virnig et al.

[11] Patent Number: 5,575,918

[45] Date of Patent: Nov. 19, 1996

[54] METHOD FOR RECOVERY OF POLYMERS

[75] Inventors: Michael J. Virnig; Phillip L. Mattison, both of Santa Rosa; Keith E. Weerts, Windsor, all of Calif.

[73] Assignee: Henkel Corporation, Plymouth Meeting, Pa.

[21] Appl. No.: 395,774

[22] Filed: Feb. 28, 1995

[51] Int. Cl.$^6$ .......................... B01D 61/00; B01D 11/00; B01D 15/04

[52] U.S. Cl. ..................... 210/652; 210/634; 210/638; 210/639; 210/651; 210/805; 210/511

[58] Field of Search ................................ 210/634, 638, 210/511, 651, 652, 639, 805

[56] References Cited

U.S. PATENT DOCUMENTS

| | | | |
|---|---|---|---|
| 2,141,569 | 12/1938 | Tucket | 106/27 |
| 3,193,575 | 7/1965 | Nebel et al. | 260/505 |
| 3,277,162 | 10/1966 | Johnson | 260/505 |
| 3,954,491 | 5/1976 | Adrian et al. | 106/100 |
| 4,465,492 | 8/1984 | Putzar | 210/653 |
| 4,661,606 | 4/1987 | Tuominen et al. | 548/497 |
| 4,886,888 | 12/1989 | Tuominen et al. | 548/497 |
| 4,886,889 | 12/1989 | Mattison et al. | 548/487 |
| 4,936,999 | 6/1990 | Mattison et al. | 210/639 |
| 5,015,456 | 5/1991 | Verbueken et al. | 423/395 |
| 5,158,603 | 10/1992 | Stierman et al. | 75/743 |
| 5,338,553 | 8/1994 | Johnson et al. | 426/36 |
| 5,434,301 | 7/1995 | Kosak | 562/96 |
| 5,501,796 | 3/1996 | Kozak et al. | 210/638 |

OTHER PUBLICATIONS

E. A. Knaggs, "Sulfonation and Sulfation," *Encyclopedia of Chemical Technology*, vol. 22, pp. 1–45 (John Wiley & Sons, Inc., NY, NY, 3rd, ed., 1983).

T. C. Lo & M. H. I. Baird, "Extraction Liquid–Liquid", *Encyclopedia of Chemical Technology*, vol. 9, pp. 672–721 (Kirk–Othmer eds, John Wiley & Sons, Inc., NY, NY, 3rd. ed., 1980).

*Chemical Abstract*, vol. 105, Abs. No. 45188v.

*Chemical Abstract*, vol. 92, Abs. No. 29200a.
*Chemical Abstract*, vol. 97, Abs. No. 12615v.
*Chemical Abstract*, vol. 100, Abs. No. 162715x.
*Chemical Abstract*, vol. 104, Abs. No. 131988s.
"The Chemistry of Metals Recovery Using LIX® Reagents", Henkel Corporation, 1990–1991 Edition.
"Technology For Decolorization and Deodorization of Fermentation Broths", *Blue Line Technical Bulletin*, Henkel/MID Extraction Technology Group, Tucson, AZ.

(List continued on next page.)

*Primary Examiner*—Ana Fortuna
*Attorney, Agent, or Firm*—Ernest G. Szoke; Wayne C. Jaeschke; John Daniel Wood

[57] ABSTRACT

A process for the separation of naphthalenesulfonate-based carbonyl condensates from water is provided. The process comprises contacting a mixture comprised of water and a naphthalenesulfonate-based carbonyl condensate (preferably a material selected from the group consisting of formaldehyde condensates of naphthalenesulfonic acids, formaldehyde condensates of lower-alkyl substituted naphthalenesulfonic acids, and mixtures of two or more of such materials) with a liquid organic phase comprised of a lipophilic non-quaternary amine to form an aqueous phase depleted with respect to said mixture of naphthalenesulfonate-based carbonyl condensate and a liquid organic phase enriched in naphthalenesulfonate-based carbonyl condensate. The process further comprises separating said aqueous phase depleted with respect to said mixture of naphthalenesulfonate-based carbonyl condensate and said liquid organic phase enriched with respect to naphthalenesulfonate-based carbonyl condensate. The process further comprises stripping the enriched liquid organic phase by contacting with an alkaline stripping solution to regenerate the cationic lipophilic amine, recycling the alkaline stripping solution for contacting with a further portion of enriched liquid organic phase. The alkaline stripping solution may then be treated by nanofiltration to separate inorganic salts from the polymeric naphthalenesulfonate-based carbonyl condensate.

26 Claims, 1 Drawing Sheet

OTHER PUBLICATIONS

Aliquat® 336, *Blue Line Technical Bulletin,* Henkel/MID, Extraction Technology Group, Tucson, AZ.
Alamine ® 308, *Blue Line Technical Bulletin,* Henkel/MID, Extraction Technology Group, Tucson, AZ.
Alamine ® 336, *Blue Line Technical Bulletin,* Henkel/MID, Extraction Technology Group, Tucson, AZ.
Alamine ® 304–1, *Blue Line Technical Bulletin,* Henkel/MID, Extraction Technology Group, Tucson, AZ.
*Encyclopedia of Chemical Technology,* vol. 24, 3rd Ed., pp. 420–426, Kirk–Othmer, John Wiley & Sons, Inc., NY. 1981.
D. R. Paul and C. Morel, "Membrane Technology", *Encyclopedia of Chemical Technology,* vol. 15, pp. 92–131 (Kirk–Othmer, eds, John Wiley & Sons, NY, NY, 3 ed., 1981).

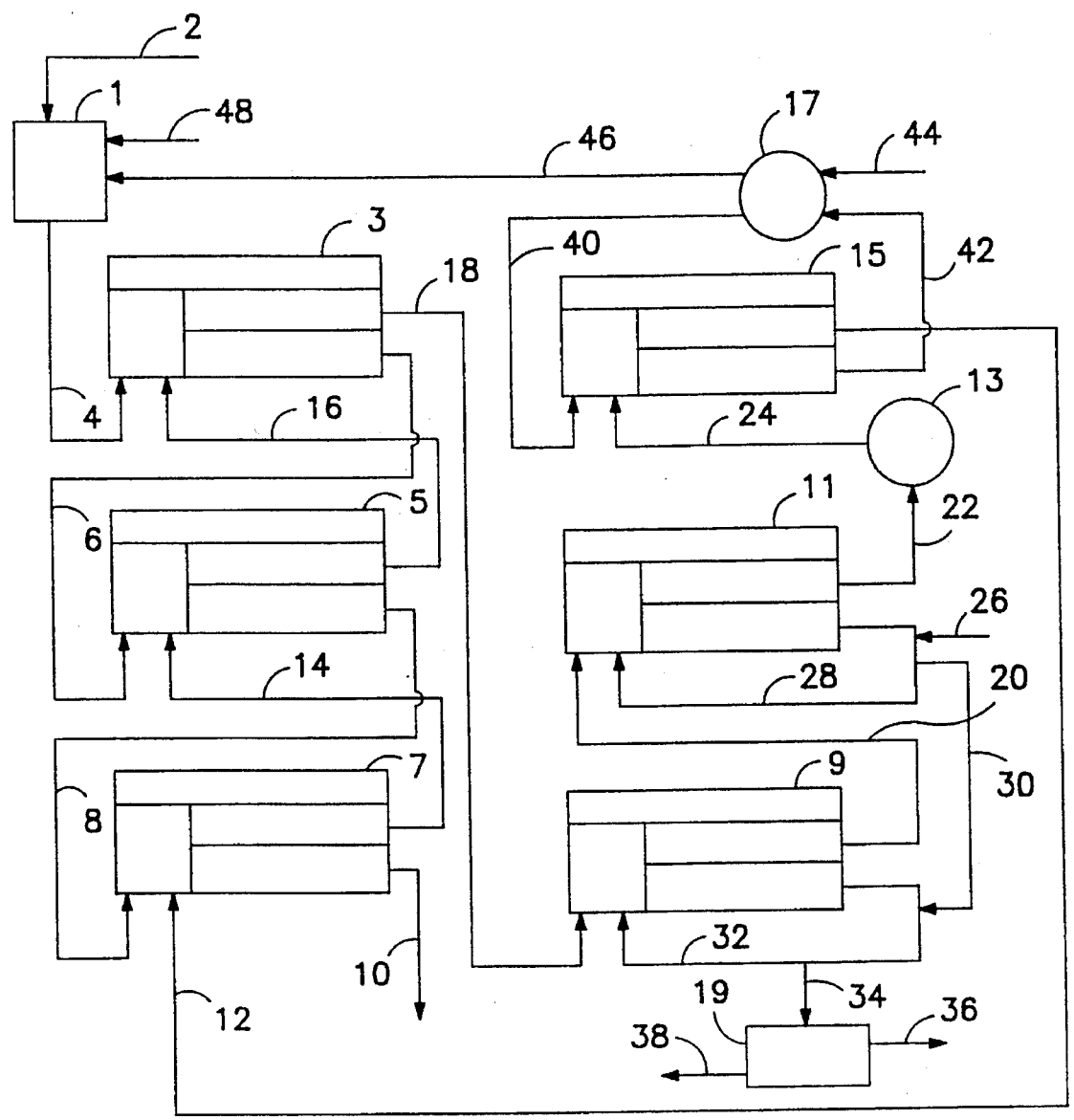
FIG. 1/1

METHOD FOR RECOVERY OF POLYMERS

FIELD OF THE INVENTION

This invention relates to a process for separating naphthalenesulfonate-based carbonyl condensates from water.

BACKGROUND OF THE INVENTION

Effluents containing organic and/or inorganic contaminants have to be purified for ecological and economic reasons. Such effluents are generated in various processes which employ polymeric naphthalenesulfonate-based condensates, e.g. as a dispersant in emulsion polymerizations. It would be desirable to be able to remove these polymeric materials from effluents so that they do not interfere with subsequent waste treatment. It would be especially desirable to additionally be able to recover the polymeric materials in a form and purity suitable for recycle or re-use.

A number of approaches have been tried for the removal of polymeric naphthalenesulfonate-based condensate from aqueous effluent. Chemical oxidation, biodegradation, flocculation, reverse osmosis and carbon adsorption are either unsuccessful in providing adequate removal, or are very expensive to implement.

Chemical Abstracts 97:12615 and 104:131988 disclose the extraction and exchange of alkyl sulfates and aryl sulfonates by solutions of trinonyloctadecylammonium chloride in mixtures of toluene and other co-solvents. Chemical Abstracts 92:29200 discloses the selective separation of benzenesulfonic acid from sulfuric acid by extraction with a solution of trioctylamine in xylene. Chemical Abstracts 100:162715 discloses the separation of aromatic sulfonic acids from sulfuric acid using solutions of primary, secondary and tertiary amines in various solvents. Chemical Abstracts 105:45188 discloses the use of a xylene solution of trioctylamine to separate the following from sulfuric acid: 3-nitrobenzenesulfonic acid, benzene-1,3-disulfonic acid, 1-nitronaphthalene-3,6,8-trisulfonic acid, and mixed naphtholsulfonic acids. In none of these cases were the species extracted polymeric molecules.

We now have discovered a process that is not only effective for removal of polymeric naphthalenesulfonate-based carbonyl condensate from effluents, but also is capable of recovering the condensate as a concentrate, and purifying that concentrate to provide material suitable for re-use.

SUMMARY OF THE INVENTION

This invention relates to a process for the separation of naphthalenesulfonate-based carbonyl condensates from water, said process comprising:

contacting a mixture comprised of water and a naphthalenesulfonate-based carbonyl condensate with a liquid organic phase comprised of a lipophilic non-quaternary amine and a water-immiscible diluent to form an aqueous phase depleted with respect to said mixture of naphthalenesulfonate-based carbonyl condensate and a liquid organic phase enriched in naphthalenesulfonate-based carbonyl condensate, separating said aqueous phase depleted with respect to said mixture of naphthalenesulfonate-based carbonyl condensate and said liquid organic phase enriched with respect to naphthalenesulfonate-based carbonyl condensate, wherein said aqueous phase depleted with respect to said mixture of naphthalenesulfonate-based carbonyl condensate has a pH of less than about 3, stripping said enriched organic phase of at least a portion of the naphthalenesulfonate-based carbonyl condensate with an alkaline aqueous strip solution to form a stripped liquid organic phase and an aqueous strip solution enriched in naphthalenesulfonate-based carbonyl condensate, recycling at least a portion of said stripped liquid organic phase to contact additional mixture of water and a naphthalenesulfonate-based carbonyl condensate, and recycling at least a portion of said aqueous strip solution enriched in naphthalenesulfonate-based carbonyl condensate to contact an additional portion of said enriched organic phase.

The process preferably further comprises treatment of at least a portion of said aqueous solution enriched in naphthalenesulfonate-based carbonyl condensate to separate inorganic salts from polymeric molecules of naphthalenesulfonate-based carbonyl condensate.

BRIEF DESCRIPTION OF THE DRAWING

FIG. 1 is a schematic representation of a preferred embodiment of the process of the invention.

DETAILED DESCRIPTION OF THE INVENTION

The first step in the process of this invention involves contacting an aqueous feed mixture comprised of water and a naphthalenesulfonate-based carbonyl condensate with a liquid organic phase comprised of a lipophilic non-quaternary amine to form an aqueous phase depleted with respect to said mixture of naphthalenesulfonate-based carbonyl condensate and a liquid organic phase enriched in naphthalenesulfonate-based carbonyl condensate. The naphthalenesulfonate-based carbonyl condensate is preferably a material selected from the group consisting of formaldehyde condensates of naphthalenesulfonic acids, formaldehyde condensates of lower-alkyl substituted naphthalenesulfonic acids, and mixtures of two or more of such materials. Other examples of naphthalene-based carbonyl condensates include the condensation products of acetone with naphthalenesulfonic acid. The naphthalenesulfonate-based material will typically be a mixture of chemical species. For example, the naphthalene will typically be derived from coal tar or a petroleum base that will contain naphthalene and one or more lower-alkyl naphthalenes. Further, sulfonation of the naphthalene base will typically produce a mixture containing some di-sulfonated naphthalenes and/or some un-sulfonated naphthalenes. The sulfonation of naphthalene is described by E. A. Knaggs, "Sulfonation and Sulfation", *Encyclopedia of Chemical Technology*, vol. 2, p. 1–45 (John Wiley & Sons, Inc., N.Y., N.Y., 3rd ed., 1983), the disclosure of which is incorporated herein by reference.

Naphthaleneformaldehyde sulfonic acid is a mixture of condensation products of naphthalenesulfonic acid and formaldehyde, such condensation products differing, for example, in the degree of polymerization. It can be chromatographed by size exclusion chromatography through a column containing pore sizes which selectively separate molecular volumes according to size, thus allowing one to obtain a measure of the degree of polymerization. The solvent chosen for the acid in chromatography should minimize solute-packing interaction and solute-solute interaction. The chromatogram gives a true molecular volume profile when the eluents are displayed on a detector-strip chart recorder display. For example, if the chromatogram for a sample of the sulfonic acid is the same as that for the sodium naphthaleneformaldehyde sulfonate in U.S. Pat. No. 3,954,491 (Adrian et al, issued May 4, 1976), the two anionic materials are identical. That is, the anionic materials from the acid have the same profile as the anionic materials from the sodium naphthaleneformaldehyde sulfonate having lowest elution volumes of from above 61 to about 70% of the total elution volume and equivalent elution volumes of from about 61 to about 70% of the total elution volume. The teachings in U.S. Pat. No. 3,954,491 relating to chromatography are incorporated by reference herein.

The condensates will generally be water soluble. The naphthalenesulfonic acid and lower alkyl substituted naphthalenesulfonic acids used as starting materials for the condensation will typically have a molecular weight below about 350. Examples of lower alkyl naphthalenesulfonic acids which will be useful herein are those wherein the total of the carbon atoms in the alkyl groups will be less than 16. Such examples include methyl naphthalenes, ethyl naphthalenes, iso-propyl naphthalenes, di-isopropyl naphthalenes, butyl naphthalenes. Typical condensates will have a number average molecular weight of from about 2,000 to about 4,000 and a weight average molecular weight of from about 7,000 to about 13,000.

Preferred examples of naphthalene-based condensates are the formaldehyde condensates of naphthalenesulfonic acids and formaldehyde condensates of lower-alkyl substituted naphthalenesulfonic acids. Sulfonated naphthalenes can be employed in the manufacture of naphthalenesulfonate formaldehyde condensates. As an alternative to pre-sulfonation, the naphthalene base can be sulfonated during the condensation with formaldehyde. Such condensation produces a product that can be considered naphthaleneformaldehyde sulfonic acid and is also known as the naphthalenesulfonic acid-formaldehyde condensates, formalin condensates of beta-naphthalenesulfonic acid, condensation products of naphthalenesulfonic acid with formaldehyde. Naphthaleneformaldehyde sulfonic acid may be prepared by reacting a mixture of naphthalene, formaldehyde and sulfuric acid or oleum. It may be prepared by the processes described in U.S. Pat. No. 2,141,569 (Tucker et al, issued Dec. 27, 1938), U.S. Pat. No. 3,193,575 (Nebel et al, issued Jul. 6, 1965), and U.S. Pat. No. 3,277,162 (Johnson, issued Oct. 4, 1966).

The aqueous feed mixture of water and naphthalenesulfonate-based material will typically contain only a minor amount of naphthalene-based material. Such minor amounts will generally range from about 10 parts per million to about 5% by weight and more typically from about 0.05% to about 1.0% by weight. Typically, the mixture will also be comprised of only minor amounts of other dissolved or dispersed species. Thus, the mixture will typically be at least about 90%, more typically at least about 95%, and most typically at least about 99.0% by weight water.

The first step of the process is to contact the aqueous feed mixture of water and naphthalenesulfonate-based carbonyl condensate with a liquid organic phase comprised of a lipophilic non-quaternary amine and a water-immiscible diluent. The liquid organic phase comprised of a lipophilic non-quaternary amine will be substantially immiscible with the mixture of water and naphthalenesulfonate-based carbonyl condensate. By "substantially immiscible" is meant that the liquid organic phase, when admixed with the mixture of water and naphthalenesulfonate-based carbonyl condensate to be extracted, will coalesce into a liquid phase that is physically separable from the water of the mixture. The substantially immiscible liquid organic phase is preferably truly immiscible or only very sparingly soluble in the mixture to eliminate or minimize the need to remove residual liquid organic phase from the water of the mixture.

This process is, in essence, a liquid—liquid extraction. The principles and mechanics of liquid—liquid extraction are disclosed in T. C. Lo and M. H. I. Baird, "Extraction Liquid—Liquid", Encyclopedia of Chemical Technology, Vol. 9, pp. 672–721 (Kirk-Othmer, eds, John Wiley & Sons, Inc., N.Y., N.Y., 3d ed., 1980), the disclosure of which is incorporated by reference. That article discloses processes and apparatus that can be adapted to the practice of this invention by one of ordinary skill in this art.

The non-quaternary amines in this invention are dissolved in a diluent to provide the liquid organic phase used in the liquid—liquid extraction process. The diluent is a water-immiscible liquid solvent capable of dissolving the non-quaternary amine and the associated ion pair complex of cationic amine and naphthalenesulfonate-based carbonyl condensate. The choice of diluent will depend on a number of factors, including the nature of the contacting equipment being used, the characteristics of the non-quaternary amine, and the presence or absence of modifiers. Examples of diluents include toluene, xylene, octane, mineral spirits, and kerosenes. Kerosenes are preferred, several types of which are available. Examples of commercially available kerosenes include Chevron Ion Exchange Solvent (available form Standard Oil of California—flash point 195° F.), Escaid 100 and 110 (available from Exxon-Europe—flash point 180° F.), Exxon Aromatic 150 (an aromatic kerosene available from Exxon-USA—flash point 160° F.), Phillips SX 1 and 7 (available from Phillips Petroleum—flash point 160° F.). Preferred kerosenes are those which have little or no aromatic content.

The lipophilic non-quaternary amines are primary, secondary or tertiary amines that have a sufficient number of aliphatic or aromatic carbon atoms to render the amine lipophilic, i.e. essentially insoluble in water, even when in cationic form. The amine will typically have at least 12 carbon atoms, preferably at least 18 carbon atoms. Preferred amines are tri-alkyl tertiary amines wherein the total number of carbon atoms in the alkyl groups is at least 22, preferably at least 24 carbon atoms, and each of the alkyl groups has at least four carbon atoms. Examples of lipophilic tertiary amines include triisooctylamine, tridodecylamine, and tri-($C_8$–$C_{10}$alkyl)amine (the latter being a compound where the alkyl groups are derived from a source of fatty alkyl groups wherein the eight carbon and ten carbon alkyl groups predominate).

At least a portion, and preferably substantially all, of the lipophilic amine will be in the cationic form during the contacting and separating steps. The extent to which tertiary amines will be present as the protonated amine will depend upon the precise basicity of the amine and the pH of the aqueous mixture of water and naphthalenesulfonate-based carbonyl condensate. Preferably the pH of the aqueous phase, at least just prior to the separating step, should be on the acid side of neutral, preferably below about pH 3.

There are two preferred modes of operation to provide such an acidic pH in the aqueous phase just prior to the separation step. In the first mode the liquid organic phase is provided to the contacting step with the amine in its neutral, unprotonated form, and the aqueous feed mixture of water and naphthalenesulfonate-based carbonyl condensate is adjusted with a mineral acid to contain a ratio of acid equivalents of mineral acid to amine equivalents of lipophilic amine in the liquid organic phase of at least about 1. Preferably, the ratio is between about 1 and about 3, and more preferably between about 1 and about 1.5. Thus when the liquid organic phase is contacted with the aqueous feed mixture of water and naphthalenesulfonate-based carbonyl condensate, the amine is able to extract an equivalent of acid and be converted substantially to its cationic form. In the second mode, the organic phase is pre-acidified before contacting the mixture of water and naphthalenesulfonate-based carbonyl condensate. This is carried out by contacting the liquid organic phase with an aqueous solution of a mineral acid, wherein the ratio of acid equivalents of the aqueous solution of mineral acid to the amine equivalents of the liquid organic phase is at least 1. Preferably the ratio is between 1 and 10, and more preferably between 2 and 5. It is preferred that after contact with the liquid organic phase in the pre-acidification step, at least a portion of the separated aqueous phase is fortified with additional mineral acid, and recycled to contact a further portion of liquid organic phase. In both modes of acidification, the preferred mineral acid is sulfuric acid, hydrochloric acid or nitric acid, with sulfuric acid being most preferred.

The lipophilic non-quaternary amine in the liquid organic phase will have a sufficient affinity for the naphthalenesulfonate-based carbonyl condensate to cause the naphthalenesulfonate-based carbonyl condensate to be extracted into the fluid extractant by anion exchange during the contacting step. To extract the naphthalenesulfonate-based carbonyl condensate from the aqueous feed mixture thereof with water, the liquid organic phase and the aqueous mixture are placed in extractive contact (i.e., greater than minimal contact is induced between the liquid organic phase and the mixture of water and naphthalenesulfonate-based carbonyl condensate). Such contact generally involves mixing of the liquid organic phase and the aqueous feed mixture to generate increased interfacial surface area between organic and aqueous phases. The conditions under which the aqueous feed mixture of water and naphthalenesulfonate-based carbonyl condensate is mixed with the liquid organic phase generally involve ambient or mildly elevated temperature (e.g., 60° C. to 100° C.) and elevated pressure if necessary to contain water or organic vapor.

Both the amount of the liquid organic phase and the amount of the lipophilic non-quaternary amine used may vary. It is generally desirable to provide at least an equivalent amount of amine with respect to the naphthalenesulfonate-based carbonyl condensate, and more preferred to have an excess of amine. However, it is not generally desirable to provide a large excess of amine since the excess of amine over naphthalenesulfonate-based carbonyl condensate will extract another anion as counter-ion, such as the anion of the mineral acid added. Then, when the liquid organic phase is stripped with an alkaline solution, the other counter-ion also transfers to the aqueous strip solution and forms a salt. Typically, the liquid organic phase will contain an amount of the lipophilic non-quaternary amine such that the ratio of amine equivalents to sulfonate equivalents of the naphthalenesulfonate-based carbonyl condensate in the mixture is from about 0.5:1 to about 5:1, preferably from about 1:1 to about 3:1, and more preferably from about 1.1:1 to about 2:1.

The weight ratio of aqueous phase (provided by the mixture of water and naphthalenesulfonate-based carbonyl condensate) to liquid organic phase may also vary broadly. The precise ratio chosen will depend, at least in part, on the apparatus and operating regime thereof that is chosen for the contacting and separation. Typically, the ratio will be from about 5:1 to about 1:5, and more typically from about 2:1 to about 1:2.

After being placed in extractive contact, the aqueous phase and liquid organic phases are separated to form an aqueous phase depleted in naphthalenesulfonate-based carbonyl condensate and an organic phase enriched in naphthalenesulfonate-based carbonyl condensate. Generally, the phases will separate, e.g., coalesce, into separate phases during the quiescent period following the cessation of mixing of the two phases. One of the phases, typically the liquid organic phase, will typically have a lower density than the other phase, typically the aqueous phase, which will allow one to physically separate the two phases, e.g., by decanting off the liquid organic phase.

The method of contacting and separating can be operated in a batch or a continuous mode. Thus, the liquid organic phase with a cationic lipophilic amine can be divided into a plurality of aliquots for multiple batch extractions of the mixture of water and naphthalenesulfonate-based carbonyl condensate (i.e., a multistage extraction) or it can be contacted with the mixture in a continuous manner (e.g., co-current, cross-current or counter-current). Apparatus conventionally employed in liquid—liquid extractions include mixer-settlers, stirred tanks, un-agitated columns, pulsed columns, rotary agitated columns, reciprocating plate columns, and centrifugal extractors. The apparatus employed to effect the method of contacting and separating will, of course, be appropriate for the precise method of contacting and separating that is chosen.

In certain embodiments of the invention, the apparatus is operated in a batch mode. In batch mode, the liquid organic phase and the mixture of water and naphthalenesulfonate-based carbonyl condensate are fed to a vessel and the contents are mixed. Mixing is then stopped and the contents of the vessel are allowed to settle and thus form distinct aqueous and liquid organic phases. The resulting aqueous and liquid organic phases are then separated by decanting liquid off the top or drawing liquid from the bottom. If desired, the liquid organic phase is removed from the vessel and a second extraction of the same aqueous phase is effected by adding fresh liquid organic phase, and then the sequence of mixing and settling is repeated. Alternatively, the aqueous phase is removed from the vessel and is replaced by a second portion of mixture of water and naphthalenesulfonate-based carbonyl condensate, and the sequence of mixing and settling is repeated.

In more preferred embodiments of this invention, the apparatus is operated in a continuous mode. In one example of a typical continuous process of this invention employing a stirred column, a mixture of water and naphthalenesulfonate-based carbonyl condensate is fed into a first feed port (for a heavier liquid, near the top of a vertical, stirred, extractor column). The mixture falls through the column while a liquid organic phase containing a lipophilic non-quaternary amine is fed to a second feed port (for a lighter liquid, near the base of the column). The liquid organic phase rises through the stirred column, i.e., countercurrent to the flow of the mixture of water and naphthalenesulfonate-based carbonyl condensate. In an un-stirred portion of the column just below the second feed port, the aqueous phase is withdrawn from the column through a bottom exit port below this zone of separation. Likewise, in an un-stirred portion of the column just above the first feed port, the liquid organic phase is withdrawn from the column through a top exit port.

A more preferred embodiment of continuous operation of this process employs mixer-settlers, especially in counter-current mode. In this embodiment, both liquid organic phase and the aqueous phase mixture of water and naphthalenesulfonate-based carbonyl condensate are fed continuously to a stirred mixing vessel in which the phases are mixed to form an emulsion with high interfacial surface area. The outlet of the mixer continuously flows to a settling tank where the liquid organic phase, now enriched in naphthalenesulfonate-based carbonyl condensate, separates from the depleted aqueous phase. Typically, the separated phases continuously overflow through an arrangement of weirs, and are advanced to the next step of the process. Usually, the extraction process of contacting and separating is repeated through two or more mixer-settler stages, in order to more completely extract the naphthalenesulfonate-based carbonyl condensate.

Where two or more mixer-settler stages are employed for extraction, countercurrent flow of the aqueous feed solution and the organic phase or extractant solution is preferably employed. In a typical 3-stage extraction system, for example, the aqueous phase mixture of water and naphthalenesulfonate-based carbonyl condensate will flow through an initial mixer-settler stage ("$E_1$"), subsequently through a second stage ("$E_2$"), and then through a final mixer-settler stage ("$E_3$"). The liquid organic phase will, in turn, initially contact the aqueous feed solution in $E_3$, encounter a subsequent contact in $E_2$ and a final contact in $E_1$. As a result, by the time the aqueous phase mixture reaches mixer-settler stage $E_3$, substantial amounts of naphthalenesulfonate-based carbonyl condensate will have been extracted from it and it will be contacting an organic phase low in naphthalenesulfonate-based carbonyl condensate. Correlatively, when the organic phase reaches mixer-settler $E_1$, much of the lipophilic amine will be in the form of an ion-pair complex with naphthalenesulfonate-based carbonyl condensate, and the organic phase will be contacting the aqueous phase mixture when it is in a condition wherein little of the dissolved naphthalenesulfonate-based carbonyl condensate has been extracted.

After the extraction step of contacting and separating the liquid organic phase and the aqueous phase mixture, the naphthalenesulfonate-based carbonyl condensate is separated from the enriched liquid organic phase by contacting the enriched liquid organic phase with an aqueous stripping solution to form a stripped organic phase and an aqueous stripping solution enriched in naphthalenesulfonate-based carbonyl condensate. The stripping solution should have sufficient alkalinity so that at least a portion of the cationic lipophilic amine in the organic phase is converted to the neutral or free base form. Preferably, the stripping solution will be an aqueous solution which contains an alkaline compound in stoichiometric excess to the cationic lipophilic amine in the liquid organic phase. The ratio of alkali equivalents of the alkaline compound to the amine equivalents of cationic amine will preferably be between 1:1 and 100:1, more preferably between 1.5:1 and 50:1, and still more preferably between 2:1 and 10:1. Typically, the pH at which the cationic lipophilic amine is converted to the neutral or free base form is pH 5 or above. Consequently, it is preferred that the amount of alkaline compound provided in the stripping solution be sufficient to provide a pH of at least 5 after contacting the enriched liquid organic phase. More preferably the pH of this aqueous solution enriched in naphthalenesulfonate-based carbonyl condensate will be at least about 7, and still more preferably at least about 9.

Preferred alkaline compounds are sodium hydroxide, potassium hydroxide, ammonium hydroxide and ammonia, with the most preferred being sodium hydroxide.

After stripping, the stripped organic phase can then be recycled to the extraction contacting step. This permits the organic phase to be reused indefinitely. Preferably, at least a portion of the stripping solution enriched in naphthalenesulfonate-based carbonyl condensate is also recycled to contact a further portion of enriched liquid organic phase. This permits the further enrichment of the stripping solution in naphthalenesulfonate-based carbonyl condensate. By extensive recycle of the stripping solution, the process is capable of building high concentrations of naphthalenesulfonate-based carbonyl condensate, effectively transferring it from a relatively large volume of dilute effluent to a relatively small volume of concentrated strip solution. Thus a major portion of the stripping solution enriched in naphthalenesulfonate-based carbonyl condensate is recycled to contact a further portion of enriched liquid organic phase, and a minor portion of the strip solution is removed from the strip stage as a concentrate.

Prior to recycle of the stripping solution, it is preferable to add further amounts of alkaline compound to restore the alkalinity consumed in the previous stripping contact. In a continuous mode of operating the process, the addition of alkaline compound may be controlled by monitoring the pH of the recycling stripping solution. Preferably the pH is maintained between about 8 and about 14, more preferably between about 10 and about 13.5, and still more preferably between 12 and 13.

In counter-current operation with more than one stage of stripping, the alkaline compound is preferably added as an alkaline solution to the last stage of stripping, i.e., the stage from which stripped organic exits. Strip solution is recycled within each stage, and is advanced progressively from the last stage to the first stage, i.e., the stage from which the aqueous strip solution exits. The rate of advance of strip solution may be controlled by the rate of addition of alkaline solution to the last strip stage, which is in turn controlled by the pH of the strip solution in the first strip stage. Thus when the pH of the first strip stage falls below a control point, fresh alkaline solution is added to the last strip stage, and a corresponding amount of strip solution flows progressively to the first strip stage. Alternatively, alkaline compound may be added to the recycling strip solution at each stage to maintain the desired pH with strip solution being advanced from the last stripping stage to the first stripping stage as the concentration of naphthalenesulfonate-based carbonyl condensate reaches the desired level.

An additional embodiment of the invention comprises the further step of treating at least a portion of the aqueous strip solution enriched in naphthalenesulfonate-based carbonyl condensate to separate inorganic salts from the polymeric molecules of naphthalenesulfonate-based carbonyl condensate. Preferably this step is accomplished by passing the enriched strip solution through a membrane filtration unit, in which a portion of the water passes through the membrane along with inorganic salts and small molecules, producing a permeate, and the remainder of the water along with the large, polymeric molecules of naphthalenesulfonate-based carbonyl condensate do not pass through the membrane, producing a retentate.

Mineral acid is typically co-extracted along with the polymeric naphthalenesulfonate-based carbonyl condensate in this invention, if completeness of extraction is desired. While the selectivity for extraction of naphthalenesulfonate-based carbonyl condensate over mineral acid is high, some excess of equivalents of amine over equivalents of naphthalenesulfonate-based carbonyl condensate is necessary to drive the extraction more nearly to completion. This excess of amine thus extracts the anion of the mineral acid, which then is carried with the liquid organic phase to stripping. In stripping, the amine is converted to its neutral or nonionic form, and all anions which were associated with the amine transfer to the aqueous stripping phase as a salt. For example, if sulfuric acid is used as the mineral acid, excess equivalents of amine will extract sulfate anion, and stripping with sodium hydroxide as the alkaline compound will generate sodium sulfate, along with the sodium salt of naphthalenesulfonate-based carbonyl condensate. A desirable feature of this embodiment of the invention is the ability not only to remove the naphthalenesulfonate-based carbonyl condensate from the aqueous effluent and to recover it as a concentrate, but also to separate the inorganic salts from the polymeric naphthalenesulfonate-based carbonyl condensate, generating a concentrate low in salt and of suitable purity for use as a product having value.

The process of this invention, thus, preferably further comprises treatment of at least a portion of said aqueous solution enriched in naphthalenesulfonate-based carbonyl condensate to separate inorganic salts from polymeric molecules of naphthalenesulfonate-based carbonyl condensate. This treatment typically comprises exerting pressure on said aqueous solution while said aqueous solution is in contact with a porous membrane; passing a permeate solution containing dissolved inorganic salts, said permeate solution being essentially free of polymeric molecules of naphthalenesulfonate-based carbonyl condensate, through said porous membrane; and collecting polymeric molecules of naphthalenesulfonate-based carbonyl condensate as a retentate.

By "porous membrane" is meant any (including "supported layer articles") having micropores and sufficient structural integrity to withstand the pressure needed to isolate the polymeric molecules of naphthalenesulfonate-based carbonyl condensate from the aqueous mixture over a desired period of time (e.g., from 15 minutes to 24 hours).

It has been found that nanofiltration is an effective means of separating polymeric molecules of naphthalenesulfonate-based carbonyl condensate from dissolved inorganic salts. Filtration using porous membranes is described generally in D. R. Paul and C. Morel, "Membrane Technology", *Encyclopedia of Chemical Technology*, Vol, 15, pp. 92–131 (Kirk-Othmer, eds., John Wiley & Sons, N.Y., N.Y., 3 ed., 1981), the disclosure of which is incorporated herein by reference. Nanofiltration processes can be generally described as part of the continuum of separation processes between reverse osmosis filtration and ultrafiltration and which operate at medium to high pressures, generally from about 150 to 600 psi. Reverse osmosis filters separate relatively smaller components having a molecular weight of less than about 500, that is, on a micromolecular scale of less than 1 nm. On the other hand, ultrafiltration is a selective fractionation type filtration using pressures up to 150 psi to retain and/or purify dissolved or suspended particles of macromolecular species, generally of a specific cut-off from 1000 to 1,000,000 in molecular weight. Fluxes in ultrafiltration are an order of magnitude less than in microfiltration. The membranes and membrane configurations typically used for nanofiltration are of the same generally type as are used in reverse osmosis filtration. In general, nanofilters provide the capability to separate low molecular weight organic compounds from monovalent ions such as from various salts like sodium chloride. Further details as to nanofiltration can be found in U.S. Pat. No. 5,338,553 (Johnson) which is incorporated herein by reference thereto.

Typically, an aqueous solution including small dissolved molecules is forced through a porous membrane. Large dissolved molecules that cannot pass through the pores are retained. Components retained by the membrane are collectively referred to as a concentrate or retentate. Components which traverse the membrane are referred to collectively as filtrate or permeate. Diafiltration is a filtration process in which the retentate is further purified or the permeable solids are extracted further by the addition of water to the retentate. This process is analogous to washing of a conventional filter cake. The use of nanofiltration removes salts formed by the neutralization of the alkaline solution and other small molecular species.

Nanofiltration is a pressure-driven filtration on a molecular scale. The porous membrane typically has a pore size cutoff ranging from about 0.8 to about 8 nanometers, e.g. 1.0 to 2.0 nanometers. A typical porous membrane is comprised of a porous article having at least one macroscopic passage therethrough (typically a cylindrical article having cylindrical passages) substantially parallel to the axis of symmetry of the cylindrical article. The retentate travels through the macroscopic passage and, thus, the filtration can be characterized as a crossflow filtration. While the article may be "porous" itself, the cylinder may act principally as a support (i.e., in a "supported layer article") for a porous layer (or layers with regard to multi-passage articles) which covers the surfaces defined by the passages through the article.

The porosity of the article, and any porous layer associated therewith as described above, can be varied as desired, with the pore size of any such layer being smaller than that of the article. In typical operation, such a filter element (i.e., cylindrical and porous article) is contained in hollow cylindrical housing and slurry is fed into the passages under pressure through a feed manifold that prevents leakage into the housing. The exit of the isolated polymeric molecules of naphthalenesulfonate-based carbonyl condensate from the passages at the other end of the filter element is controlled by an exit manifold which also prevents leakage into the housing where the filtrate or permeate is contained.

A further embodiment of this invention provides for contacting of the stripped organic phase with an aqueous solution of a mineral acid prior to recycling for further extraction of naphthalenesulfonate-based carbonyl condensate. This step converts the amine in the liquid organic phase from its neutral form to its cationic form, so that little or no excess acid needs to be supplied in the aqueous feed mixture of water and naphthalenesulfonate-based carbonyl condensate during extraction to maintain the pH below about 3. After contacting and separating the organic and aqueous phases, it is preferable to return the aqueous phase to a reservoir where the acidity level is restored by addition of mineral acid. At least a major portion of the re-acidified aqueous phase is returned to contact a further portion of stripped organic phase. This recycling allows the aqueous to be reused multiple times. A minor or intermittent portion of the re-acidified aqueous can optionally be used as a bleed stream to acidify the aqueous feed mixture of water and naphthalenesulfonate-based carbonyl condensate. This gives a constructive use of the contained acid in the bleed stream, and allows a control for buildup of other components in the aqueous mineral acid solution, such as salts.

The separated mixture of water and naphthalenesulfonate-based carbonyl condensate after extraction can be post-treated to remove residual amounts of liquid organic phase using other purification techniques, e.g. treatment with activated carbon or other adsorbents.

The extent of the reduction in concentration of naphthalenesulfonate-based carbonyl condensate in the aqueous phase will, of course, depend upon the extent of contact with the liquid organic phase and the precise efficiency of the liquid organic phase under the given contact conditions. Generally, the liquid organic phase will remove at least a significant portion of the naphthalenesulfonate-based carbonyl condensate. By "significant" is meant more than a nominal amount, e.g., at least 10% by weight and preferably at least 30% by weight of the naphthalenesulfonate-based carbonyl condensate in the mixture of water and naphthalenesulfonate-based carbonyl condensate. Preferably, the concentration of naphthalenesulfonate-based carbonyl condensate in the water after said contacting and separating are completed will be less than 0.1%, more typically less than 0.03%, and preferably less than 0.01%.

FIG. 1 is a schematic representation of a preferred embodiment of the process of the invention using mixer-settlers in a continuous mode of operation. In FIG. 1, an aqueous feed mixture 2 of water and naphthalenesulfonate-based carbonyl condensate is led to a mix tank 1 where the pH is brought to about 3 by addition of mineral acid 48. The acidified aqueous mixture 4 is pumped at a fixed rate to a series of three counter-current extraction mixer-settlers, designated as 3, 5 and 7. Aqueous mixture 4 is mixed in mixer-settler 3 with partially loaded liquid organic phase 16 from mixer-settler 5. The organic-aqueous mixture overflows into the settling compartment of mixer-settler 3, and separates into discrete organic and aqueous phases. Partially extracted aqueous phase 6 flows to the mixer of mixer-settler 5, where it is mixed with organic phase 14 from mixer-settler 7. After separation of phases in mixer-settler 5, organic phase 16 flows to the mixer of mixer-settler 3, and aqueous phase 8 flows to the mixer of mixer-settler 7, where it is mixed with acidified organic phase 12 from mixer-settler 15. After separation of phases in mixer-settler 7, organic phase 14 flows to mixer-settler 5, and aqueous phase 10, now depleted of naphthalenesulfonate-based carbonyl condensate, is discharged as treated effluent. Separated organic phase 18 from mixer-settler 3, now enriched in naphthalenesulfonate-based carbonyl condensate, flows to a series of two stripping mixer-settlers, designated as 9 and 11. Organic phase 18 is mixed in the mixer of mixer-settler 9 with an alkaline strip solution 32. After separation in the settler compartment of mixer-settler 9, the aqueous phase is combined with additional alkaline strip solution 30 from mixer-settler 11, and a first major portion 32 of the combined aqueous stripping stream is recycled to the mixer of mixer-settler 9 to strip another portion of enriched organic phase 18. A minor second portion 34 of the mixed aqueous stripping stream is diverted as concentrated naphthalenesulfonate-based carbonyl condensate to a pressure filtration unit 19, where an aqueous stream 38 of salt is separated from a product stream 36 of concentrated and purified naphthalenesulfonate-based carbonyl condensate. The separated organic phase 20 from mixer-settler 9, now partially stripped of naphthalenesulfonate-based carbonyl condensate, flows to the mixer of mixer-settler 11, where it is mixed with an aqueous alkaline stripping solution 28. After separation in the settler compartment of mixer-settler 11, the organic phase 22, now stripped of naphthalenesulfonate-based carbonyl condensate, flows to an organic phase surge tank 13. The separated aqueous strip phase from mixer-settler 11, now enriched in naphthalenesulfonate-based carbonyl condensate, is combined with fresh aqueous alkaline solution 26, and a major first portion 28 of the combined aqueous strip phase is recycled to the mixer of mixer-settler 11. A minor second portion 30 flows to be combined with the separated aqueous strip solution from mixer-settler 9. Stripped organic phase 24 from the organic surge tank 13 is pumped at a controlled rate to the mixer of mixer-settler 15, where it is mixed with an aqueous mineral acid solution 40. After separation in the settler compartment of mixer-settler 15, the organic phase 12, now having its lipophilic amine in the cationic form, flows to the mixer of mixer-settler 7, completing the organic circuit. The separated aqueous phase from mixer-settler 15 flows to an acid wash reservoir 17, where mineral acid 44 is added to maintain a desired level of acidity. A major portion 40 of the aqueous mineral acid solution is pumped to the mixer of mixer-settler 15 to acidify another portion of stripped organic 24, and a minor portion 46 of the aqueous mineral acid solution is pumped to mix tank 1 to assist in acidification of incoming aqueous mixture 2.

The subject matter of this application is similar to U.S. Ser. No. 08/395,738, filed on even date herewith, which is a continuation-in-part of U.S. Ser. No. 08/287,014, filed Aug. 8, 1994, the disclosures of which are incorporated herein by reference.

The following examples are intended to illustrate the invention without limiting it in any way.

EXAMPLES

Example 1

An organic extractant solution was prepared by dissolving 7.15 g of tri-($C_8$–$C_{10}$alkyl)amine (available as Alamine 336 from Henkel Corp., Ambler, Pa.) and 75 g of iso-tridecanol (available from Exxon) in Escaid 110, a non-aromatic kerosene available from Exxon, and diluting to one liter. Amine concentration in this organic solution is 0.018M. A portion of this organic was pre-acidified by contacting in a separatory funnel with an equal volume of 50 g/L sulfuric acid.

Two samples of effluent containing naphthalenesulfonate-based carbonyl condensate (the condensate being available as Lomar PL from Henkel Corp., Ambler, Pa.) condensate were first adjusted with sulfuric acid to pH 2.5, and then were contacted with an equal volume of pre-acidified organic by shaking in a separatory funnel. After shaking was stopped, separated aqueous phase was analyzed for naphthalenesulfonate-based carbonyl condensate by conducting a UV scan from 190 nm to 400 nm with a Perkin Elmer spectrophotometer. The absorbance of the aqueous phase at 230 nm was compared with the absorbance at 230 nm of a known sample of 20 ppm of the naphthalenesulfonate-based carbonyl condensate Lomar PL in water. From ratio of the absorbances of the aqueous phase and the known sample, the concentration of naphthalenesulfonate-based carbonyl condensate in the aqueous phase was calculated. Results are reported in Table 1.

TABLE 1

| Extraction of Lomar Condensate by Tertiary Amine | | |
|---|---|---|
| | Lomar Condensate Concentration | |
| Effluent Sample | Before Extraction | After Extraction |
| A | 3280 ppm | 300 ppm |
| B | 880 ppm | 110 ppm |

These results show a large reduction of condensate level with a single solvent extraction contact with the tertiary amine organic phase.

Example 2

The organic solution of Example 1 was loaded to about 4500 ppm Lomar condensate by contacting with Effluent Sample A of Example 1. Loaded organic solution was then stripped by contacting in a separatory funnel with aqueous solutions containing 0.05M sodium hydroxide and either 4.4, 11 or 44% Lomar condensate. The resulting organic was separated, filtered, and a portion of the filtered organic was contacted a second time with 0.05M NaOH to determine residual Lomar condensate on the organic phase. The separated aqueous phase was filtered and analyzed by the UV method of Example 1. In each case the Lomar condensate values were 11–12 ppm, indicating that the loaded organic was effectively stripped by alkaline solution, even in the presence of high aqueous concentrations of Lomar condensate.

Example 3

Kinetics experiments were run using a 2½ inch square plastic box with a 1½ inch slotted disk impeller stirring at 1500 rpm. 125 mL of Effluent A of Example 4 were acidified with sulfuric acid to pH 2.6 and added to the box. With the impeller mixing, 125 mL of the pre-acidified organic of Example 4 were added, and a timer was started. Samples of emulsion were withdrawn at specified intervals and allowed to separate. Separated aqueous layers were filtered and analyzed for Lomar condensate by the UV method of Example 1. Results are reported in Table 2.

TABLE 2

Kinetics of Extraction and Stripping by Tertiary Amine

| Time, sec. | Extraction Kinetics Aq. Lomar, ppm | Stripping Kinetics Aq. Lomar, ppm |
| --- | --- | --- |
| 15 | 370 | 7000 |
| 30 | 335 | 6500 |
| 60 | 345 | 6500 |
| 120 | 350 | 6500 |
| 300 | 350 | 6500 |

These results indicate that both the extraction and stripping of Lomar concentrate are very fast, and should not present a significant limitation in continuous circuit operation.

Example 4

Lomar condensate was recovered from effluent Sample B of Example 1 using a laboratory scale circuit of continuous mixer-settlers. Rectangular mixer-settlers had mixer volumes of about 165 mL and settler volumes of about 415 mL. The circuit was configured with three stages of countercurrent extraction, two stages of countercurrent stripping, and one stage of acid washing. The stripping mixer-settlers were configured with aqueous recycle to allow build-up of a concentrate of Lomar condensate. The organic phase was formulated to contain 0.01M Alamine 336 and 75 g/L isotridecanol in Escaid 110 kerosene. The aqueous effluent feed was acidified with sulfuric acid to pH 2.5. Aqueous strip solution in the first strip stage ($S_1$) was initially formulated to contain 15 g/L sodium sulfate, and adjusted with sodium hydroxide to pH 13. When returning from the strip stage, this solution was led to a reservoir where additional sodium hydroxide solution was added to maintain pH 13. Aqueous strip solution in the second strip stage ($S_2$) was initially formulated to contain 0.1M sodium hydroxide and 25 g/L sodium sulfate. Acid wash aqueous solution was formulated to contain 25 g/L sodium sulfate, and sufficient sulfuric acid to reach pH 1. When returning from the acid wash stage, this aqueous was led to a reservoir where additional sulfuric acid was added to maintain pH 1. The circuit was operated with the following flow rates: organic=15 mL/min, aqueous extraction feed=30 mL/min, strip aqueous feed=7.5 mL/min, and acid wash aqueous feed=15 mL/min. After a period of continuous running, each of the streams were sampled and analyzed for concentration of Lomar condensate. Results are shown in Table 3.

TABLE 3

Circuit Profile for Removal of Lomar Condensate

| Stage | Lomar Condensate Concentration, ppm | |
| --- | --- | --- |
| | Aqueous | Organic |
| $E_1$ | 296 | 1070 |
| $E_2$ | 129 | 469 |
| $E_3$ | 87 | 154 |
| $S_1$ | 4,895 | 2 |
| $S_2$ | 1,965 | 0.8 |
| W | 3 | 75 |

From an original aqueous feed concentration of 880 ppm Lomar condensate, the data show that the tertiary amine solvent extraction circuit gave about 90% removal, and that the organic phase was effectively stripped by the alkaline strip solution, permitting recycle of the organic phase for further extraction. At the same time, the extracted Lomar condensate was transferred into an aqueous concentrate.

What is claimed is:

1. A process for the separation of naphthalenesulfonate-based carbonyl condensates from water, said process comprising:

contacting a mixture comprised of water and a naphthalenesulfonate-based carbonyl condensate with a liquid organic phase comprised of a lipophilic non-quaternary amine and a water-immiscible diluent to form an aqueous phase depleted with respect to said mixture of naphthalenesulfonate-based carbonyl condensate and a liquid organic phase enriched in naphthalenesulfonate-based carbonyl condensate, separating said aqueous phase depleted with respect to said mixture of naphthalenesulfonate-based carbonyl condensate and said liquid organic phase enriched with respect to naphthalenesulfonate-based carbonyl condensate, wherein said aqueous phase depleted with respect to said mixture of naphthalenesulfonate-based carbonyl condensate has a pH of less than about 3, stripping said enriched organic phase of at least a portion of the naphthalenesulfonate-based carbonyl condensate with an alkaline aqueous strip solution to form a stripped liquid organic phase and an aqueous strip solution enriched in naphthalenesulfonate-based carbonyl condensate, recycling at least a portion of said stripped liquid organic phase to contact additional mixture of water and a naphthalenesulfonate-based carbonyl condensate, and recycling at least a portion of said aqueous strip solution enriched in naphthalenesulfonate-based carbonyl condensate to contact an additional portion of said enriched organic phase.

2. A process as claimed in claim 1 wherein said naphthalenesulfonate-based carbonyl condensate is a member selected from the group consisting of formaldehyde condensates of naphthalenesulfonic acids, formaldehyde condensates of lower-alkyl substituted naphthalenesulfonic acids, and mixtures of two or more of such members.

3. A process as claimed in claim 1 wherein said naphthalenesulfonate-based carbonyl condensate has a number average molecular weight of from about 2,000 to about 4,000 and a weight average molecular weight of from about 7,000 to about 13,000.

4. A process as claimed in claim 1 wherein said naphthalene-based condensate comprises 10 parts per million to about 5% by weight of said mixture thereof with water.

5. A process as claimed in claim 1 wherein said naphthalene-based condensate comprises from about 0.05% to about 1.0% by weight of said mixture thereof with water.

6. A process as claimed in claim 1 wherein said mixture is comprised of at least about 95% water.

7. A process as claimed in claim 1 wherein said non-quaternary amine is selected from the group consisting of aliphatic primary, secondary and tertiary amines having at least 18 carbon atoms.

8. A process as claimed in claim 1 wherein said non-quaternary amine is a tri-alkyl tertiary amine wherein the total number of carbon atoms in the alkyl groups is at least 22 and each of the alkyl groups has at least four carbon atoms.

9. A process as claimed in claim 1 wherein said non-quaternary amine is a tri-($C_8$–$C_{10}$alkyl)amine.

10. A process as claimed in claim 1 wherein said mixture of water and a naphthalenesulfonate-based carbonyl condensate prior to contacting said liquid organic phase contains a mineral acid, wherein the ratio of acid equivalents of said mineral acid to sulfonate equivalents of said naphthalenesulfonate-based carbonyl condensate is at least about 1.

11. A process as claimed in claim 10 wherein said mineral acid is selected from the group consisting of hydrochloric acid, nitric acid and sulfuric acid.

12. A process as claimed in claim 1 wherein the non-quaternary amine in said organic phase prior to contacting said mixture of water and a naphthalenesulfonate-based carbonyl condensate is converted to its cationic form by being contacted with an aqueous phase containing a mineral acid, wherein the ratio of acid equivalents of said mineral acid to amine equivalents of said non-quaternary amine is at least about 1.

13. A process as claimed in claim 12 wherein the mineral acid is selected from the group consisting of hydrochloric acid, nitric acid and sulfuric acid.

14. A process as claimed in claim 1 wherein the ratio of amine equivalents of said lipophilic non-quaternary amine to sulfonate equivalents of said naphthalenesulfonate-based carbonyl condensate is from about 1:1 to about 3:1.

15. A process as claimed in claim 1 wherein the weight ratio of aqueous phase provided by the mixture of water and naphthalenesulfonate-based carbonyl condensate to liquid organic phase is from about 5:1 to about 1:5.

16. A process as claimed in claim 1 wherein an alkaline compound is added to said aqueous solution enriched in naphthalenesulfonate-based carbonyl condensate prior to said contact with an additional portion of said enriched organic phase.

17. A process as claimed in claim 1 wherein said aqueous strip solution enriched in naphthalenesulfonate-based carbonyl condensate has a pH of at least about 5.

18. A process as claimed in claim 1 wherein said alkaline aqueous strip solution comprises a mixture of water and an alkaline compound selected from the group consisting of sodium hydroxide, potassium hydroxide, ammonia and ammonium hydroxide.

19. A process as claimed in claim 1 wherein said contacting is carried out continuously.

20. A process as claimed in claim 19 wherein said continuous contacting is carried out in mixer-settlers.

21. A process as claimed in claim 19 wherein said continuous contacting comprises at least two countercurrent stages of separation of naphthalenesulfonate-based carbonyl condensate from water, and at least two countercurrent stages of stripping.

22. A process as claimed in claim 1 wherein said process further comprises, prior to said recycling at least a portion of the stripped liquid organic phase, contacting said stripped liquid organic phase with an aqueous phase containing a mineral acid, wherein the ratio of acid equivalents of said mineral acid to amine equivalents of said non-quaternary amine is at least about 1.

23. A process as claimed in claim 1 wherein said contacting and separating are effective in reducing the concentration of said naphthalenesulfonate-based carbonyl condensate in said mixture to less than about 0.03% by weight.

24. A process as claimed in claim 1 wherein said process further comprises treatment of at least a portion of said aqueous solution enriched in naphthalenesulfonate-based carbonyl condensate to separate inorganic salts from polymeric molecules of naphthalenesulfonate-based carbonyl condensate.

25. A process as claimed in claim 24 wherein said treatment comprises nanofiltration.

26. A process for the recovery of naphthalenesulfonate-based carbonyl condensates from water, said process comprising:

contacting a mixture comprised of water and a naphthalenesulfonate-based carbonyl condensate selected from the group consisting of formaldehyde condensates of naphthalenesulfonic acids, formaldehyde condensates of lower-alkyl substituted naphthalenesulfonic acids, and mixtures of two or more of such members, said condensate having a number average molecular weight of from about 2,000 to about 4,000 and a weight average molecular weight of from about 7,000 to about 13,000, wherein said naphthalene-based condensate comprises 10 parts per million to about 5% by weight of said mixture thereof with water, with a liquid organic phase comprising a water-immiscible diluent and a tri-alkyl amine wherein the total number of carbon atoms in the alkyl groups is at least 22 and each of the alkyl groups has at least four carbon atoms, wherein the ratio of amine equivalents of said tri-alkyl amine to sulfonate equivalents of said naphthalenesulfonate-based carbonyl condensate is from about 1:1 to about 3:1, to form an aqueous phase depleted with respect to said naphthalenesulfonate-based carbonyl condensate and a liquid organic phase enriched in said naphthalenesulfonate-based carbonyl condensate, wherein said aqueous phase depleted with respect to said naphthalenesulfonate-based carbonyl condensate has a pH of less than about 3, separating said aqueous-phase depleted with respect to said naphthalenesulfonate-based carbonyl condensate and said liquid organic phase enriched with respect to naphthalenesulfonate-based carbonyl condensate, wherein said contacting and separating are effective in reducing the concentration of said naphthalenesulfonate-based carbonyl condensate in said mixture to less than about 0.03% by weight, stripping said enriched liquid organic phase of at least a portion of the naphthalenesulfonate-based carbonyl condensate by contacting with an alkaline aqueous strip solution to form a stripped liquid organic phase and an aqueous strip solution enriched in naphthalenesulfonate-based carbonyl condensate, recycling at least a portion of said stripped liquid organic phase to contact additional mixture of water and naphthalenesulfonate-based carbonyl condensate, recycling at least a portion of said aqueous strip solution enriched in naphthalenesulfonate-based carbonyl condensate to contact an additional portion of said enriched organic phase, and treatment of at least a portion of said aqueous strip solution enriched in naphthalenesulfonate-based carbonyl condensate by nanofiltration to separate inorganic salts from polymeric molecules of naphthalenesulfonate-based carbonyl condensate.

* * * * *